US012796624B2

(12) United States Patent
Karlov

(10) Patent No.: US 12,796,624 B2
(45) Date of Patent: Nov. 17, 2026

(54) POT SYSTEM TO PREVENT OVERWATERING AND UNDERWATERING OF PLANTS UNDER A CONTINUOUS WATERING SCHEDULE

(71) Applicant: Plandts LLC, Chicago, IL (US)

(72) Inventor: Daniel Karlov, Chicago, IL (US)

(73) Assignee: PLANDTS LLC, Chicago, IL (US)

( * ) Notice: Subject to any disclaimer, the term of this patent is extended or adjusted under 35 U.S.C. 154(b) by 3 days.

(21) Appl. No.: 18/892,818

(22) Filed: Sep. 23, 2024

(65) Prior Publication Data

US 2025/0107493 A1 Apr. 3, 2025

Related U.S. Application Data

(60) Provisional application No. 63/541,868, filed on Oct. 1, 2023.

(51) Int. Cl.
*A01G 9/04* (2006.01)
*A01G 9/02* (2018.01)

(52) U.S. Cl.
CPC . *A01G 9/04* (2013.01); *A01G 9/02* (2013.01)

(58) Field of Classification Search
CPC ........................................................ A01G 9/04
See application file for complete search history.

(56) References Cited

U.S. PATENT DOCUMENTS 1,251,552 A 1/1918 Marks
2,504,031 A * 4/1950 Manning .................. A01G 9/04 248/346.11
3,058,263 A 10/1962 Reynolds
3,125,255 A 3/1964 Kaiser
3,604,150 A 9/1971 Baumann
4,092,804 A * 6/1978 Morris ..................... A01G 9/04 47/71
4,213,271 A 7/1980 Ashton et al.
4,216,623 A * 8/1980 Silver .................... A01G 27/02 47/80
4,224,764 A * 9/1980 Dziewulski .............. A01G 9/04 215/393
4,446,652 A 5/1984 Anderson
4,481,733 A * 11/1984 Jacobs ..................... A01G 9/04 47/71
5,174,062 A 12/1992 Kim
5,638,638 A * 6/1997 Moskowitz .............. A01G 9/04 47/73

(Continued)

*Primary Examiner* — Jessica B Wong
(74) *Attorney, Agent, or Firm* — Hahn Loeser & Parks LLP

(57) ABSTRACT

A system for consistently and continuously watering plants without interruption or adjustment over the life of a plant or for a period of 1 to 3 years. A pot is substantially filled with root components of a plant and a volume of soil. The pot is positioned within an overflow saucer. The saucer may have a base that is equal to or up to ⅓ larger than the base of the pot. The pot may have one or more weep holes at or near its base for releasing water from the pot into the overflow saucer. The pot is elevated within the overflow saucer. The pot may be elevated within the overflow saucer by a riser. Adding water to the pot weekly, wherein the water is added at a ratio of a water volume to a pot volume of between 1:10 and 1:15. The plant pot system further comprises a ratio of a height of the riser to a height of the pot of between 1:20 and 1:24.

20 Claims, 5 Drawing Sheets

(56) References Cited

U.S. PATENT DOCUMENTS

| | | | | |
|---|---|---|---|---|
| 5,727,347 | A | 3/1998 | Sellers | |
| 6,357,180 | B1 | 3/2002 | Huang | |
| 6,517,035 | B1 | 2/2003 | Sellers | |
| 6,669,113 | B2 | 12/2003 | Halle | |
| 6,675,532 | B2 | 1/2004 | Fidotti | |
| 7,093,391 | B2 | 8/2006 | Eakin | |
| 7,237,357 | B2 | 7/2007 | Kleeberg et al. | |
| 7,278,238 | B2 | 10/2007 | Maniscalco et al. | |
| 7,690,151 | B2 | 4/2010 | Wilkes | |
| 7,730,666 | B2 | 6/2010 | Spray | |
| 8,191,310 | B2 | 6/2012 | Keats | |
| 8,347,552 | B1 | 1/2013 | Johnson, III | |
| 8,381,441 | B2 | 2/2013 | Altendorfer et al. | |
| 8,555,547 | B2 | 10/2013 | Hashimoto et al. | |
| 10,076,196 | B2 | 9/2018 | Westbrooks | |
| 10,285,347 | B2 | 5/2019 | Tchira | |
| 11,083,144 | B2 | 8/2021 | Proulx et al. | |
| 11,246,268 | B2 | 2/2022 | Spencer | |
| 11,266,079 | B2 | 3/2022 | Hung et al. | |
| 12,114,623 | B2 * | 10/2024 | Gaczewski .............. | A01G 9/04 |
| 2002/0024445 | A1 | 2/2002 | Takayama et al. | |
| 2003/0136050 | A1 * | 7/2003 | Smead ..................... | A01G 9/04<br>47/71 |
| 2005/0217172 | A1 | 10/2005 | Korte et al. | |
| 2006/0032132 | A1 * | 2/2006 | Liffers ..................... | A01G 9/04<br>47/71 |
| 2006/0168883 | A1 | 8/2006 | Brutsche et al. | |
| 2007/0089366 | A1 | 4/2007 | Kasatshko | |
| 2012/0243940 | A1 | 9/2012 | Thenhaus | |
| 2012/0255226 | A1 * | 10/2012 | Salen ..................... | A01G 9/045<br>47/71 |
| 2014/0059920 | A1 * | 3/2014 | Messina ................... | A01G 9/04<br>43/131 |
| 2014/0138460 | A1 | 5/2014 | Weiland | |
| 2015/0250107 | A1 | 9/2015 | Joseph et al. | |
| 2016/0100534 | A1 | 4/2016 | Chang | |
| 2016/0198641 | A1 | 7/2016 | Lee | |
| 2018/0116128 | A1 | 5/2018 | Gin | |
| 2020/0029506 | A1 * | 1/2020 | Spencer ................... | A01G 9/04 |
| 2021/0161080 | A1 | 6/2021 | Stratton | |
| 2022/0117174 | A1 | 4/2022 | Barnwell | |

* cited by examiner

POT SYSTEM TO PREVENT OVERWATERING AND UNDERWATERING OF PLANTS UNDER A CONTINUOUS WATERING SCHEDULE

BACKGROUND

This disclosure relates to the field of horticulture and plant care. Specifically, the present disclosure relates to maintaining a controlled watering environment for plants. More specifically, the present disclosure relates to a controlled watering environment for plants based on defined watering intervals relative to the plant and soil volume within a pot for establishing an adequate drainage system to support the same over the life of the plant.

Plants are grown in pots and pots are often provided with an overflow saucer into which excess water might escape from the pot. Pots must be removed from the overflow saucer in order to remove any excess or stale water from the overflow saucer over the life of a plant. In the event no excess water makes it to the overflow saucer the plants are underwatered and risk harm or death. Alternatively, a caretaker may skip a watering because the saucer is full of water and the caretaker does not wish to add water, risking the saucer might overflow. In other words, it is inconvenient for a caretaker to undertake the extra effort to remove the water from the saucer and, instead, may decide to skip a scheduled watering. The excess water in the saucer, while impacting a caretaker's approach toward caring for a plant, provides no benefit to the plant and only possesses stale water which needlessly accumulates. Alternatively, if the pot is resting within the saucer, below the water level within the saucer, the excess water of the saucer might weep back into the pot resulting in overwatering of the plant and/or causing root rot. When a caretaker does choose to remove excess water from the saucer, the operation risks making a mess or spilling water at or near the plant (e.g., upon the surface which the plant is located, the floor, etc.), defeating the purpose of having an overflow saucer to begin with. Such operations risk both overwatering and underwatering a plant, leading to improper plant care and a detriment to the plant's health Current plant pot watering operations are negatively affected by these conditions. The above-mentioned conditions negatively affect or upset a continuous and consistent watering operation of the plant by requiring adjustment to watering frequency and amount to prevent overflow from the overflow saucer, removal and emptying of an overflow saucer, changing of pot or saucer conditions, and/or may even result in overwatering by having a pot rest in stale water of the overflow saucer. This only further results in wasteful and inconsistent use of water. Accordingly, current plant pot watering operations are inconsistent and require continuous monitoring and adjustment when these conditions arise, resulting in increased maintenance which only upsets a continuous and consistent watering schedule. Additionally, or alternatively, such operations also risk leading to underwatering of plants and not fully saturating the soil in an effort to prevent overflow.

In view of this, what is needed is a system to accommodate a continuous and consistent plant watering operation without overaccumulation of water in an overflow saucer. What is needed is a system which prevents wicking of water from the overflow saucer back into the plant pot. What is needed is a system which eliminates the need for maintenance, removal, and/or replacement of the saucer from the plant pot. What is needed is a system which eliminates the need to empty water from the water saucer over the duration of the life of a plant. What is needed is a system that removes the guesswork out of watering plants.

SUMMARY

The present disclosure is a system for consistently and continuously watering plants without interruption or adjustment over the life of a plant, or, as illustrated by an example herein, a period of 1 to 3 years. The plant pot system of the present disclosure comprises a pot substantially filled with root components of a plant and a volume of soil. The pot is positioned within an overflow saucer. The saucer may comprise a base that is equal to or up to ⅓ larger than the base of the pot. The pot may further comprise one or more weep holes at or near its base for releasing water from the pot into the overflow saucer. The pot is elevated within the overflow saucer. The pot may be elevated within the overflow saucer by a riser. In the plant pot system, water is added weekly, wherein the water is added at a ratio of a water volume to a pot volume of between 1:10 and 1:15. The plant pot system further comprises a ratio of a height of the riser to a height of the pot of between 1:20 and 1:24.

In some examples, the ratio of the water volume to pot volume is 1:12.5. Additionally or alternatively, the ratio of the height of the riser to a height of the pot is 1:22. In some examples, the base of the saucer is the same size as, or is equal to, the base of the pot. In some examples, the base of the saucer is no more than ⅓ larger than the base of the pot. In an example, the base of the saucer is ⅓ larger than the base of the pot. In some examples, the riser amounts to 20% or less than the volume of the overflow saucer below the base of the pot. In some examples, the riser amounts to 10% or less than the volume of the overflow saucer below the base of the pot. In some examples, the pot is separated from the saucer by the riser. In some examples, the height of the saucer is equal to or greater than the height of the riser. In some examples, the riser is within a closed environment between the pot and the saucer that is inaccessible from outside of the pot and saucer. In some examples, the riser material may be a porous material. The porous material may further support evaporation of the water released from the one or more weep holes into the saucer.

In the plant pot system, by maintaining the ratio of water volume to pot volume and the ratio of the height of the riser to the height of the pot, the water volume released from the one or more weep holes never reaches an underside of the pot within the saucer over a period of 1 to 3 years. Stated in another manner, the volume of water released from the one or more weep holes into the saucer does not accumulate to greater than a volume of the saucer below the base of the pot over a period of 1 to 3 years.

Also disclosed herein is a method of operation of the above-mentioned examples of a plant pot system. The method may comprise the steps of:

- assembling the pot within the overflow saucer on top of the riser;
- adding a plant with the root components of the plant positioned within the pot and filling the remainder of the pot with a volume of soil;
- watering the plant in the pot on a continuous and consistent basis weekly for a period of 1 to 3 years;
- maintaining the assembly of the pot, the saucer, and the riser without interruption or adjustment for a period of 1 to 3 years.

In examples of the method of operation, the overflow saucer is never emptied of water over the period of 1 to 3 years. In examples, no water accumulates week-to-week in the overflow saucer. In examples, water accumulates week-to-week in the overflow saucer in year 2. In examples, more water accumulates week-to-week in the overflow saucer in year 3 than in year 2.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

The present disclosure details a system which prevents both overwatering and underwatering of plants within a pot under a consistent watering schedule. The system of the present disclosure eliminates water spillage from a pot's overflow saucer. The system of the present disclosure ensures a plant receives a continuous and consistent amount of water over its life, supporting continuous and healthy root growth. Specifically, the present system ensures roots grow to the bottom of the pot, thereby, filling the pot entirely rather than gathering at the surface due to underwatering. Accordingly, a larger root system supports larger and healthier plants. The system of the present disclosure prevents needless re-potting of plants or removal and replacement of an overflow saucer. The system of the present disclosure prevents the need to empty an overflow saucer of water while maintaining a continuous and consistent watering schedule. The system of the present disclosure prevents a pot from resting in excess water of an overflow saucer. The system of the present disclosure prevents water of an overflow saucer from reaching a pot and wicking back into the pot, thereby causing root rot. The system of the present disclosure supports the optimal plant humidity from the water collected in an overflow saucer by having an adequate evaporation environment enveloping the plant. The system of the present disclosure further supports adequate evaporation of the water which reaches the overflow saucer and further encourages and promotes said evaporation to maintain a continuous and consistent watering schedule.

Figure 1:
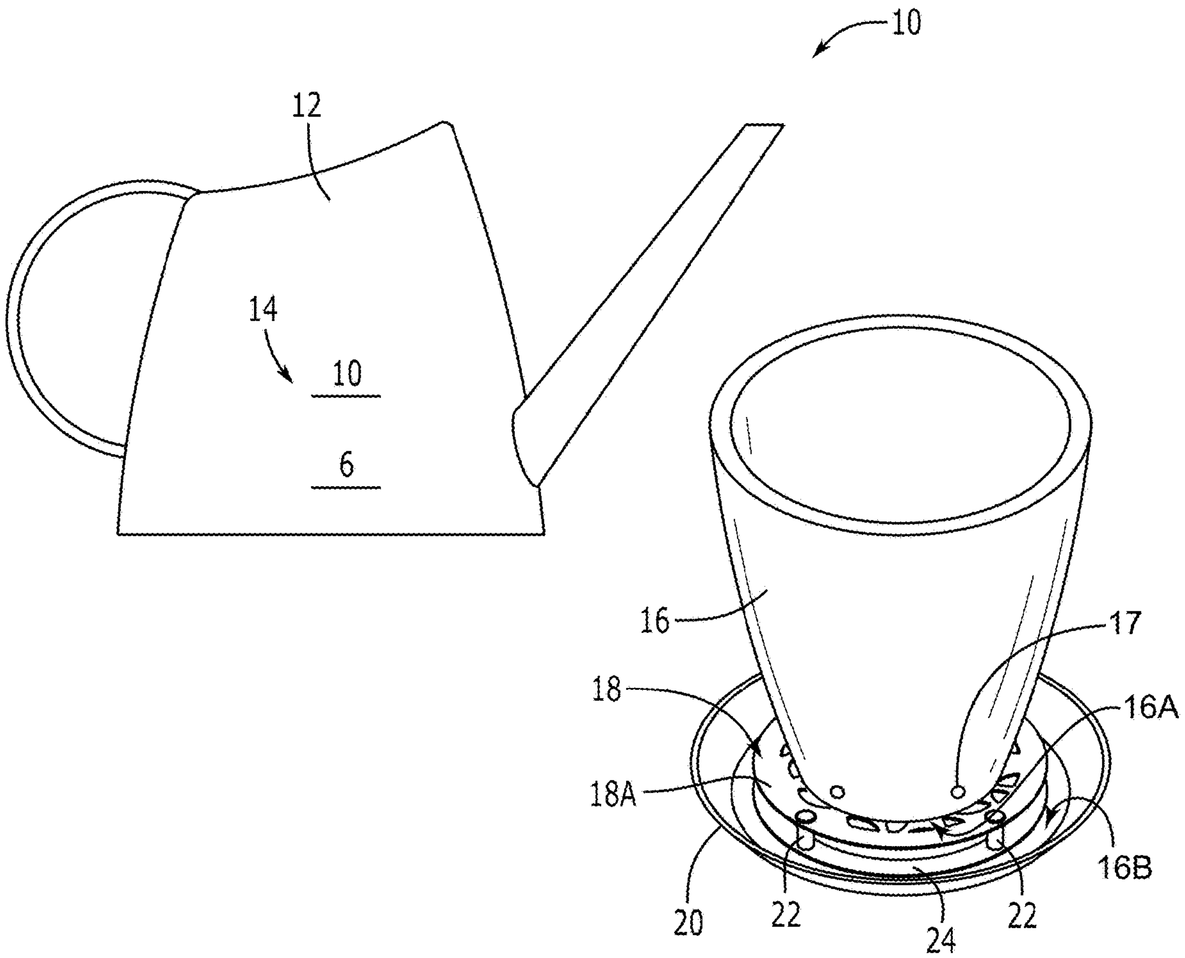
FIG. 1 is a side perspective view of a pot system, in accordance with an example of the disclosure.
Figure 2:
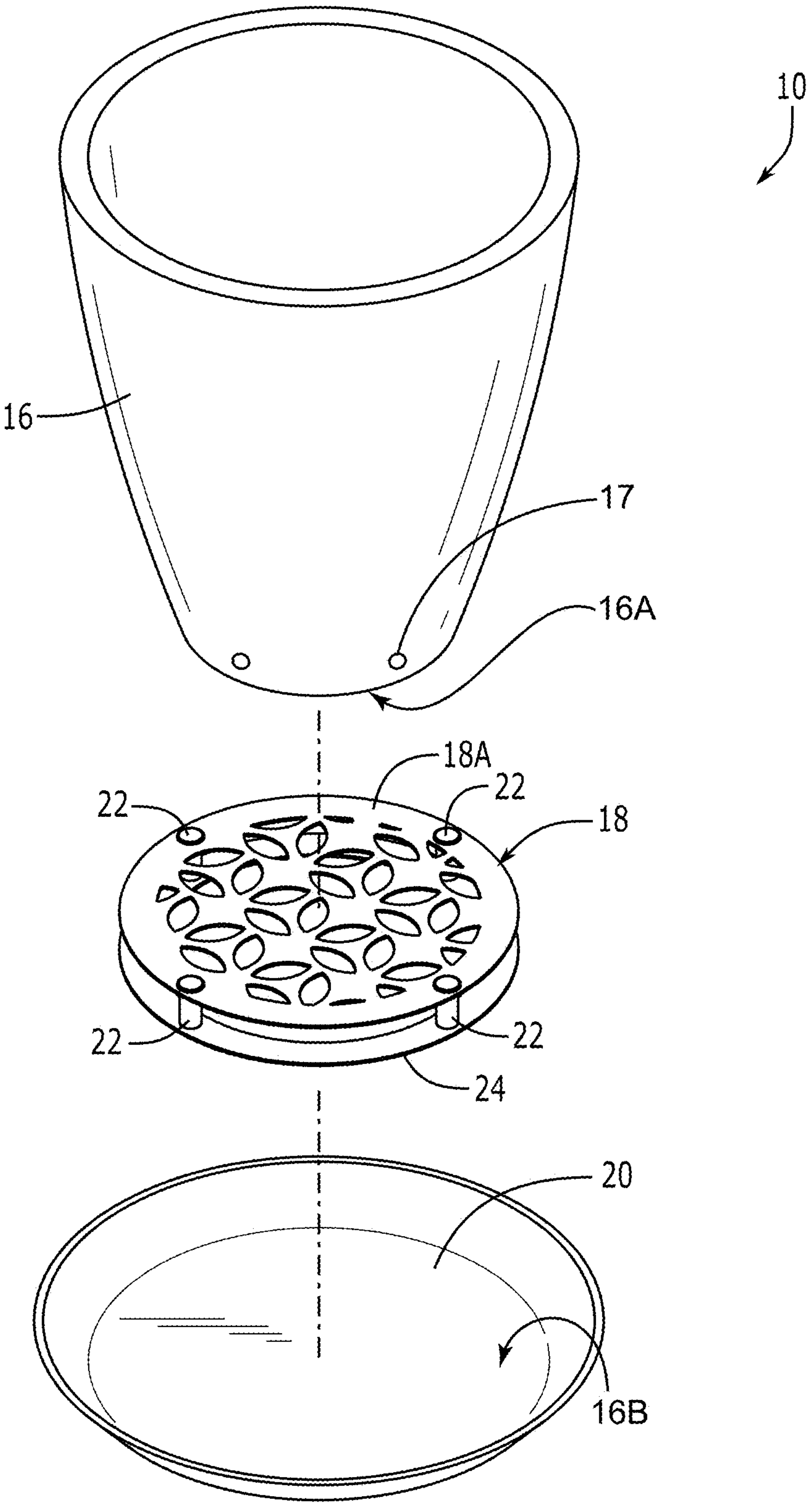
FIG. 2 is an exploded perspective view of a pot system, in accordance with an example of the disclosure.

FIGS. 1-2 illustrate the components of the pot system 10 of the present application. The pot system 10 may comprise a watering can 12. A watering measurement indicia 14 is further illustrated in FIG. 1 to support operation of the system under a continuous and consistent watering schedule, as further described herein. However, it is contemplated herein the application of water, by virtue of a continuous and consistent watering schedule, may come in many forms. FIGS. 1-2 further illustrates a plant pot 16. The plant pot 16 has a base 16A. The plant pot 16 is positioned within an overflow saucer 20. The overflow saucer 20 has a base 20A. A riser 18, or spacer, is provided to elevate the plant pot 16 within the overflow saucer 20. The plant pot 16 further comprises one or more weep holes 17.

Figure 3:
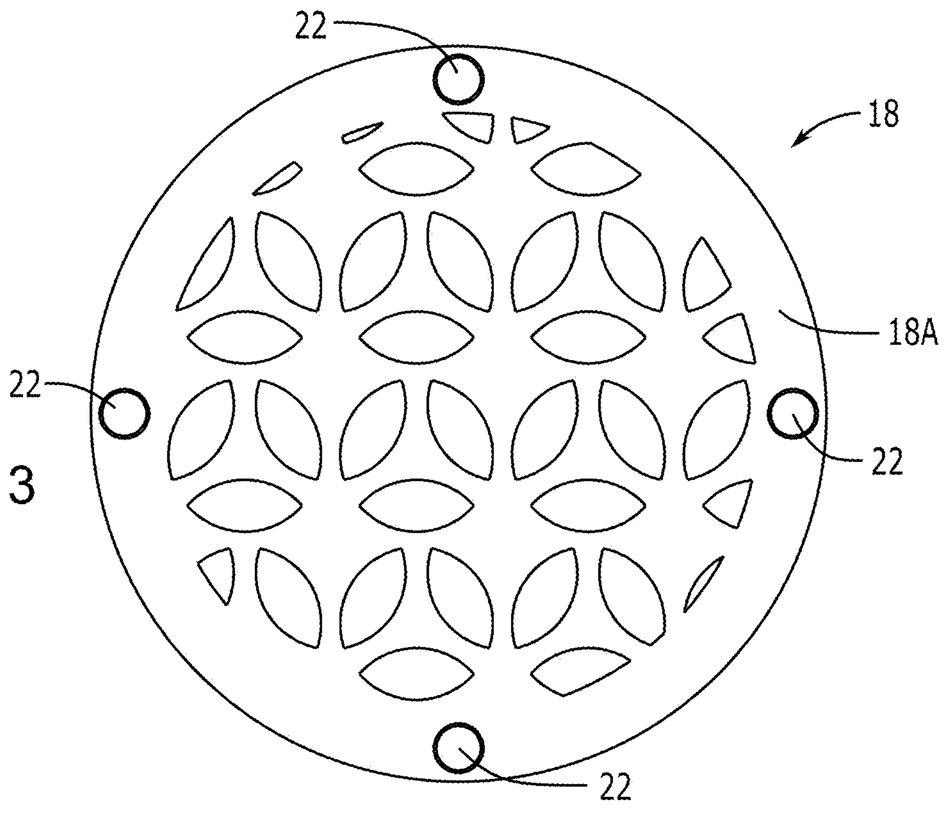
FIG. 3 is a top view of a riser of a pot system, in accordance with an example of the disclosure.
Figure 4:
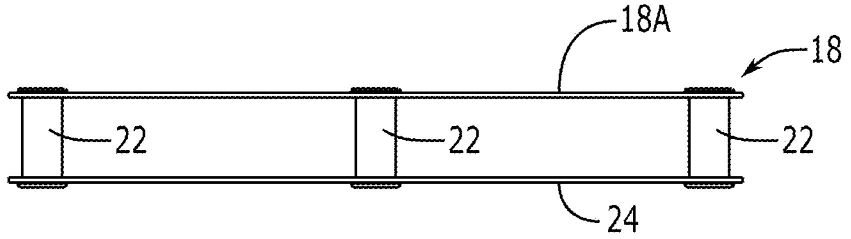
FIG. 4 is a side view of a riser of a pot system, in accordance with an example of the disclosure.
Figure 5:
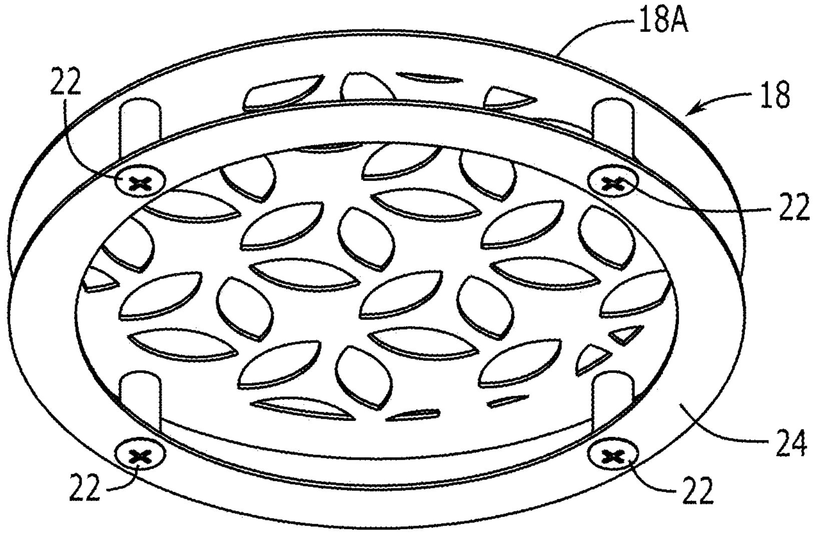
FIG. 5 is a bottom perspective view of a riser of a pot system, in accordance with an example of the disclosure.
Figure 6:
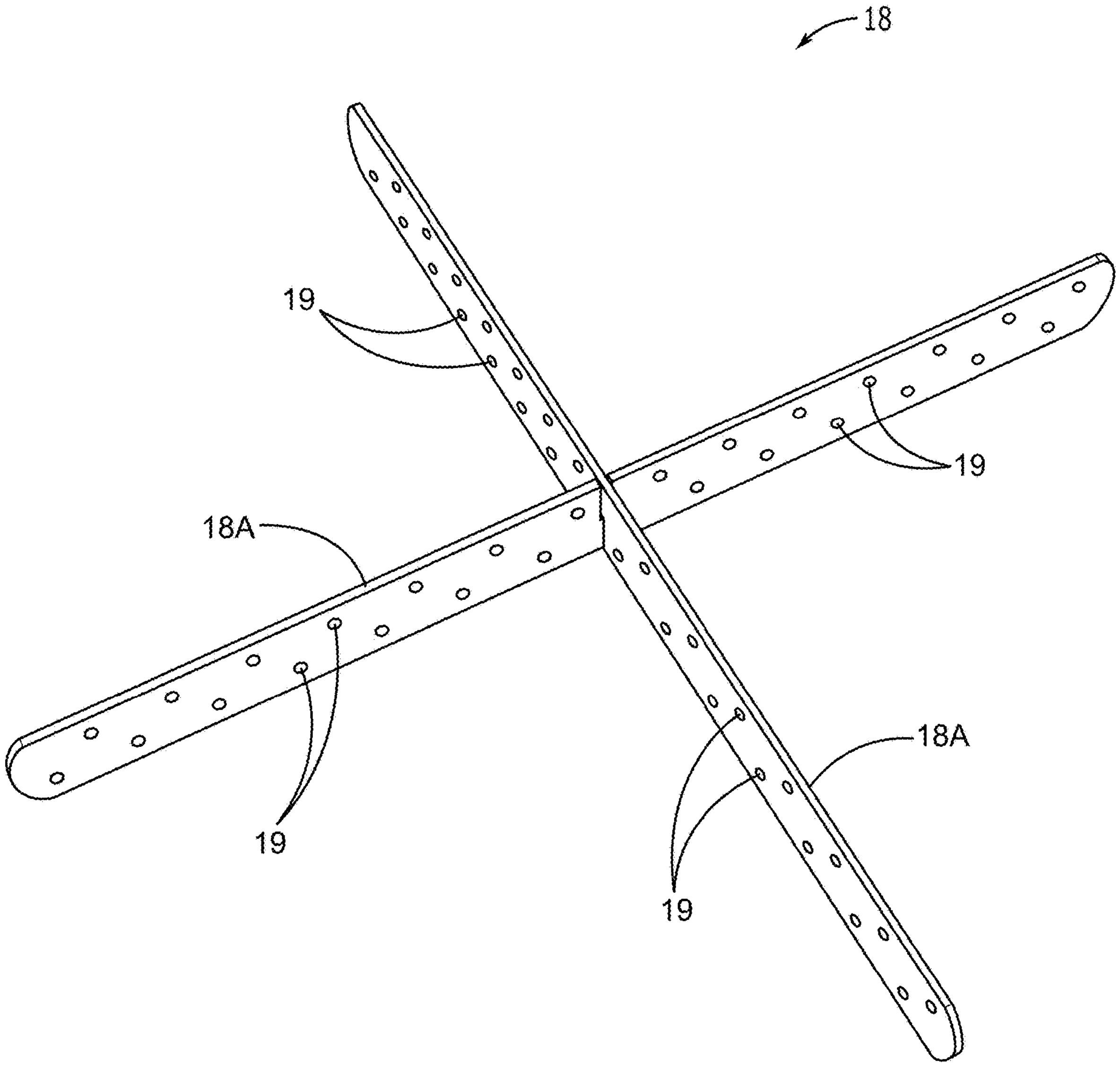
FIG. 6 is a top perspective view of an alternative example of a riser of a pot system, in accordance with an example of the disclosure.

The riser may take many forms as illustrated by FIGS. 3-5 and the alternative example of FIG. 6. The riser 18 of FIGS. 1-2 is further illustrated by FIGS. 3-5. The riser 18 comprises a top plate 18A on which the plant pot 16 may be placed within the overflow saucer 20. The construction of the riser 18 may be one of numerous components which are held together by fasteners 22 and may, additionally, include stabilizing components, such as a bottom ring 24. The riser may be made of a variety of materials or in a variety of arrangements. FIG. 6 illustrates another example of a riser 18 having cross members 18A, 18B to support a plant pot. In one example, the riser, or components thereof, may be made of porous materials to support the transfer of water therethrough and to further encourage and/or increase evaporation to promote the purpose of the present disclosure as further explained herein. For example, pores 19 are illustrated in the riser 18 of FIG. 6. The pores may additionally, or alternatively, be pores that are not visible to the naked eye. The pores may simply be a component of the material properties of the riser. By example, the riser may be terracotta, unglazed ceramic, bamboo, fiber, concrete, a combination thereof, or the like. In a specific example, the porosity of a riser may be provided to balance the pores size to account for absorption while additionally maintaining water in the saucer such as, for example, a concrete riser. Alternatively, the porosity of the riser may be of the kind that absorbs all of the water where the evaporation of the absorbed water further assists with producing humidity when evaporated therefrom. The riser may be an independent component or the riser may be a part of the saucer and/or pot, such as being baked into one or the either or both. The riser, saucer, and/or pot may be made of the same material, or different material, or a combination thereof. Additionally or alternatively, the riser or components thereof may be of a spongy material which absorbs water, also encouraging or increasing evaporation therefrom to promote the purpose of the present disclosure as further explained herein. In some examples, the riser amounts to less than 20% of the volume of the overflow saucer below the base of the pot. In some examples, the riser amounts to less than 10% of the volume of the overflow saucer below the base of the pot.

The system of the present disclosure relies on a correlation between the pot dimensions and a quantity of water being added thereto under a consistent and continuous schedule, via a ratio therebetween. The elevation of the pot within an overflow saucer is further in a corresponding relationship to the above-mentioned parameters to accomplish the purpose of the present disclosure. Prior pot arrangements do not rely on such arrangements. For example, prior pot arrangements may rely on a significantly oversized overflow saucer to accommodate excess water, but with no corresponding relationship to the size of the pot and/or to the quantity of water being added to the pot under a consistent and continuous schedule. Moreover, prior pot arrangements do not consider a height of the riser relative to the pot dimensions, let alone, a height of the riser relative to pot dimension as it relates to the quantity of water being added thereto under a consistent and continuous schedule. By applying the arrangements recited herein a caretaker is assured a plant will not be overwatered or underwatered by virtue of a consistent and continuous watering schedule and the caretaker is additionally assured the quantity of water in the overflow saucer will never reach the base of the pot or requiring removal and/or emptying of the overflow saucer over the life of a plant, or for a period of 1-3 years as illustrated by an example herein.

The plant pot system of the present disclosure comprises a pot substantially filled with root components of a plant and a volume of soil. As used herein, a pot that is substantially filled is filled 90% or more with root components of a plant and a volume of soil. In examples, the pot may be entirely filled. The pot is positioned within an overflow saucer. The saucer may comprise a base that is equal to or up to ⅓ larger than the base of the pot. The pot may further comprise one or more weep holes at or near its base for releasing water from the pot into the overflow saucer. The pot is elevated within the overflow saucer. The pot may be elevated within the overflow saucer by a riser. In the plant pot system, water is added to the pot weekly with water at a ratio of a water volume to a pot volume of between 1:10 and 1:15. The plant pot system further comprises a ratio of a height of the riser to a height of the pot of between 1:20 and 1:24.

In some examples, the ratio of the water volume to pot volume is 1:12.5. Additionally or alternatively, the ratio of the height of the riser to a height of the pot is 1:22. In some examples, the base of the saucer is the same size as, or is equal to, the base of the pot. In some examples, the base of the saucer is no more than ⅓ larger than the base of the pot. In some examples, the riser amounts to 20% or less than the volume of the overflow saucer below the base of the pot. In some examples, the riser amounts to 10% or less than the volume of the overflow saucer below the base of the pot. In examples, the pot is separated from the saucer by the riser. In examples, the height of the saucer is equal to or greater than the height of the riser. In some examples, the riser is within a closed environment between the pot and the saucer that is inaccessible from outside of the pot and saucer. In examples, the riser material may be a porous material. The porous material may further support evaporation of the water released from the one or more weep holes into the saucer.

In some examples, the frequency may be adjusted such as, for example, bi-weekly instead of weekly. However, in such instances the amount of water would simply be doubled for the bi-weekly operation, or the like. Accordingly, the watering frequency may be adjusted to any interval of time based on the original weekly proportions, with corresponding adjustments to those proportions.

In the plant pot system, by maintaining the ratio of water volume to pot volume and the ratio of the height of the riser to the height of the pot, the water volume released from the one or more weep holes never reaches an underside of the pot within the saucer over a period of 1 to 3 years. Stated in another manner, the volume of water released from the one or more weep holes into the saucer does not accumulate to greater than a volume of the saucer below the base of the pot over a period of 1 to 3 years.

Also disclosed herein is a method of operation of the above-mentioned examples of a plant pot system. The method may comprise the steps of:

assembling the pot within the overflow saucer on top of the riser;

adding a plant with the root components of the plant positioned within the pot and substantially filling the remainder of the pot with a volume of soil;

watering the plant in the pot on a continuous and consistent basis weekly for a period of 1 to 3 years;

maintaining the assembly of the pot, the saucer, and the riser without interruption or adjustment for a period of 1 to 3 years.

In examples of the method of operation, the overflow saucer is never emptied of water over the period of 1 to 3 years. In examples, no water accumulates week-to-week in the overflow saucer. In examples, water accumulates week-to-week in the overflow saucer in year 2. In examples, more water accumulates week-to-week in the overflow saucer in year 3 than in year 2.

Figure 7:
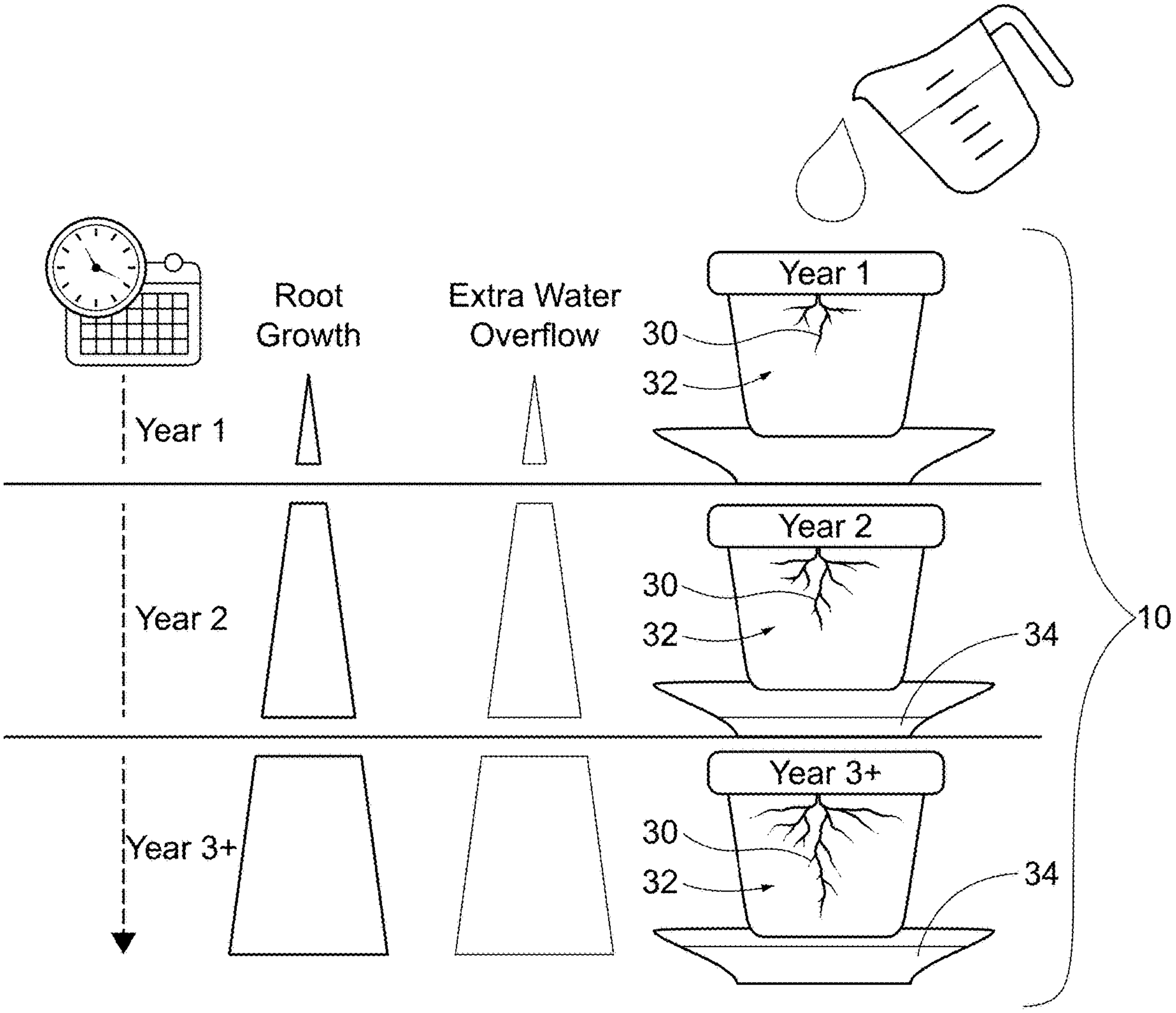
FIG. 7 is an example of the operation of the pot system, in accordance with an example of the disclosure.

Under the above parameters, the overflow saucer maintains any overflow water therein. Aside from evaporation, there is no other removal mechanism necessary for removal of the water reaching the overflow saucer. The water which is added to the pot flows through the soil and is not only slowed by the soil but is slowed by the root growth, which continues to grow over the life of a plant, providing retention of water in the pot but still providing a release of additional water into the overflow saucer to accommodate said root growth. For example, as root growth increases, the pot is capable of releasing additional water into the overflow saucer without negatively impacting the plant and/or the continuous and consistent watering as set forth by the system herein. While the watering schedule is consistent and continuous, the water within the overflow saucer never accumulates to reaching the base of the pot within the overflow saucer in view of the parameters identified herein. This occurs throughout the life of a plant, as illustrated by the progression of FIG. 7. For example, FIG. 7 illustrates a consistent and continuous watering schedule over several years in a pot system 10 of the present disclosure, and further illustrates the variable results corresponding to root growth 30 within the soil 32, water overflow 34, and duration as supported and contemplated herein.

For example, because the root growth varies over time, it is also appreciated the transfer of water through the pot additionally varies over time. Thus, the parameters identified herein are based on and provide a long-term use of the pot system such as, for example, over a 1 to 3 year period of time. By further providing an overflow saucer with a riser height which corresponds to the dimensions of the pot, under a continuous and consistent water supply, the complexity of the structure of the present disclosure is kept to a minimum while still achieving the outcome supported and described by the present disclosure. For example, no plugs, conduits, or pipes are required to plug or, alternatively, for additional fluid flow from the overflow saucer, thus, avoiding the possibility of failure of such. Further, the pot of the present disclosure is not a closed pot, which would only result in the oversaturation of plants and root rot by trapping the water within the pot. Moreover, wasteful use of water is eliminated, such as when water must be removed from an overflow saucer by means other than natural evaporation.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A plant pot system, the plant pot system comprising:

A pot substantially filled with root components of a plant and a volume of soil, the pot positioned within an overflow saucer, the saucer comprising a base with a size that is equal to or up to ⅓ larger than a size of the base of the pot, the pot comprising one or more weep holes at or near its base for releasing water from the pot into the overflow saucer, the pot elevated within the overflow saucer by a riser, and water at a ratio of a water volume to a pot volume of between 1:10 and 1:15, wherein a ratio of a height of the riser to a height of the pot is between 1:20 and 1:24.

2. The system of claim 1, wherein the ratio of the water volume to the pot volume is 1:12.5.

3. The system of claim 1, wherein the ratio of the height of the riser to the height of the pot is 1:22.

4. The system of claim 1, wherein the ratio of the water volume to pot volume is 1:12.5 and the ratio of the height of the riser to the height of the pot is 1:22.

5. The system of claim 1, wherein the size of the base of the saucer is equal to the size of the base of the pot.

6. The system of claim 1, wherein the size of the base of the saucer is no more than ⅓ larger than the size of the base of the pot.

7. The system of claim 1, wherein the riser amounts to 20% or less than the volume of the overflow saucer below the base of the pot.

8. The system of claim 1, wherein the riser amounts to 10% or less than the volume of the overflow saucer below the base of the pot.

9. The system of claim 1, wherein the riser material is a porous material supporting evaporation of the water released from the one or more weep holes into the saucer.

10. The system of claim 9, wherein the porous material additionally absorbs the water.

11. The system of claim 1, wherein the pot is separated from the saucer by the riser.

12. The system of claim 1, wherein a height of the saucer is equal to or greater than the height of the riser.

13. The system of claim 1, wherein the riser is within a closed environment between the pot and saucer that is inaccessible from outside of the pot and saucer.

14. A method of operating a plant pot system of claim 1, the method comprising the steps of:

assembling the pot within the overflow saucer on top of the riser;

adding a plant with the root components of the plant positioned within the pot and substantially filling the remainder of the pot with a volume of soil;

adding the water at the ratio of the water volume to the pot volume of between 1:10 and 1:15 to the pot weekly on a continuous and consistent basis for a period of 1 to 3 years;

maintaining the assembly of the pot, the saucer, and the riser without interruption or adjustment for the period of 1 to 3 years.

15. The method of claim 14, wherein by maintaining the ratio of water volume to pot volume and the ratio of the height of the riser to a height of the pot the water volume released from the one or more weep holes never reaches an underside of the pot within the saucer over a period of 1 to 3 years.

16. The method of claim 14, wherein the volume of water released from the one or more weep holes into the saucer does not accumulate to greater than a volume of the saucer below the base of the pot over a period of 1 to 3 years.

17. The method of claim 14, wherein the overflow saucer is never emptied of water over the period of 1 to 3 years.

18. The method of claim 14, wherein no water accumulates week-to-week in the overflow saucer.

19. The method of claim 18, wherein water accumulates week-to-week in the overflow saucer in year 2.

20. The method of claim 19, wherein more water accumulates week-to-week in the overflow saucer in year 3 than in year 2.

* * * * *